US006880695B2

(12) United States Patent
Suzuki et al.

(10) Patent No.: US 6,880,695 B2
(45) Date of Patent: Apr. 19, 2005

(54) BOARD PROCESSING UNIT

(75) Inventors: Hiroyuki Suzuki, Shizuoka-ken (JP); Hirotoshi Kubota, Shizuoka-ken (JP); Yoshiyuki Yamauchi, Shizuoka-ken (JP)

(73) Assignee: Heian Corporation, Shizuoka-ken (JP)

( * ) Notice: Subject to any disclaimer, the term of this patent is extended or adjusted under 35 U.S.C. 154(b) by 0 days.

(21) Appl. No.: 10/693,406

(22) Filed: Oct. 24, 2003

(65) Prior Publication Data

US 2005/0011731 A1 Jan. 20, 2005

(30) Foreign Application Priority Data

Jul. 14, 2003 (JP) ....................................... 2003-196488

(51) Int. Cl.[7] ................................................ B65G 23/00
(52) U.S. Cl. ..................... 198/832.1; 198/458; 198/456
(58) Field of Search ........................... 198/626.1, 626.2, 198/626.3, 626.4, 626.5, 626.6, 832.1, 458, 456

(56) References Cited

U.S. PATENT DOCUMENTS 3,102,627 A * 9/1963 Acton et al. ............ 198/345.1
3,308,750 A * 3/1967 Voegelin ..................... 101/126
3,403,622 A * 10/1968 Moser et al. ............... 101/126
3,949,864 A * 4/1976 Montsant .................... 198/835
4,432,450 A * 2/1984 Dorigo ....................... 198/832
4,483,266 A * 11/1984 Olasz et al. ................ 112/304
4,949,768 A * 8/1990 Giles et al. .................. 144/4.1
5,080,258 A * 1/1992 Hinterreiter ................. 221/198
5,331,874 A * 7/1994 Foster et al. .................. 83/423
5,492,504 A * 2/1996 Wolters ....................... 453/54
5,536,472 A * 7/1996 Terashima et al. ............ 422/63
5,605,249 A * 2/1997 Gonyea ......................... 221/6
5,640,891 A * 6/1997 Hoffa .......................... 83/155
6,068,159 A * 5/2000 Rodriguez Reyes et al. ..... 221/232
6,085,937 A * 7/2000 Hutchinson et al. ........ 221/122
6,092,446 A * 7/2000 Hardesty ..................... 82/148
6,099,212 A * 8/2000 Marocco ........................ 408/3
6,206,262 B1 * 3/2001 Achelpohl et al. .......... 225/100
6,216,756 B1 * 4/2001 Mason .................... 144/248.5
6,269,285 B1 * 7/2001 Mignault .................... 700/236
6,394,308 B1 * 5/2002 Yuyama et al. ............. 221/265
6,450,752 B1 * 9/2002 Hill ............................ 198/429
6,490,502 B1 * 12/2002 Fellows et al. ............. 700/231
6,502,719 B1 * 1/2003 Huang ........................ 221/227
6,712,197 B1 * 3/2004 Kubota et al. .............. 198/620

* cited by examiner

*Primary Examiner*—Kathy Matecki
*Assistant Examiner*—Rashmi Sharma
(74) *Attorney, Agent, or Firm*—Richard M. Goldberg

(57) ABSTRACT

A board process unit includes end supports, pulleys rotatably mounted on the end supports, a carrying belt extending around the pulleys for holding a process board, two parallel screw shafts mounted at opposite sides of the carrying belt, a servomotor for rotating the screw shafts, two moving members each having a boss engaging a screw shaft, first cylinders mounted on the moving members, grasping members mounted relative to the moving members by the cylinders for movement toward and away from the moving members, such that both ends of the carrying belt are adapted to be grasped by the grasping members by moving the cylinders respectively mounted on the moving members, pushing rollers for pushing a process board positioned on the carrying belt, second cylinders for moving the pushing rollers into engagement with the process board, and a processing unit for processing the process board.

4 Claims, 7 Drawing Sheets

BOARD PROCESSING UNIT

BACKGROUND OF THE INVENTION

The present invention relates to a board process unit in which a carry belt is held by holding members which are positioned and moved and a board on the carry belt is processed by a tool.

In a prior board processing unit, a first upper conveyer is rotated by a first servomotor, a second upper conveyer is rotated by a second servomotor, a first lower conveyer opposite to the first upper conveyer is rotated by a third servomotor, and a second lower conveyer opposite to the second upper conveyer is rotated by a fourth servomotor. The first, second, third and fourth servomotors are synchronized with each other. The tool of a head in a numerical control router is held at an upper portion between the first and second upper conveyers and is passed between the first and second upper conveyers and between the first and second lower conveyers, and thus a process board is processed by the tool.

However, in this prior board processing unit, though the first, second, third and fourth servomotors are synchronized with each other and though the process board is held, positioned and processed by the first upper conveyer and the first lower conveyer and is held by the second upper conveyer and the second lower conveyer, when the process board is positioned and processed between the first upper conveyer and the first lower conveyer and between the second upper conveyer and the second lower conveyer, respectively, a lag causes between the first upper and lower conveyers and the second upper and lower conveyers, and a processing precision of the process board is not satisfactory.

SUMMARY OF THE INVENTION

It is, therefore, the primary object of the present invention to provide a board processing unit in which there is no lag between a rotation of a servomotor and a motion of the conveyer.

It is another object of the present invention to provide a board processing unit in which a process board set on a conveyer is pushed by the push rollers on the carry belt and thereby a process lag does not result.

In order to accomplish the above and other objects, the present invention comprises large pulleys freely rotated and respectively mounted on end supports in both ends, a carrying belt wrapped around the large pulleys, two screw shafts attached respectively to both ends of the carrying belt in parallel, a servomotor for rotating the two screw shafts, two moving members respectively having a boss engaging the screw shaft respectively, a grasping member mounted respectively to the two moving members, with both ends of the carrying belt being grasped by the grasping member by moving a cylinder respectively mounted on the two moving members, pushing rollers pushing a process board positioned on the carrying belt by up-down cylinders and a process unit for processing the process board.

DESCRIPTION OF THE PREFERRED EMBODIMENTS

Figure 1:
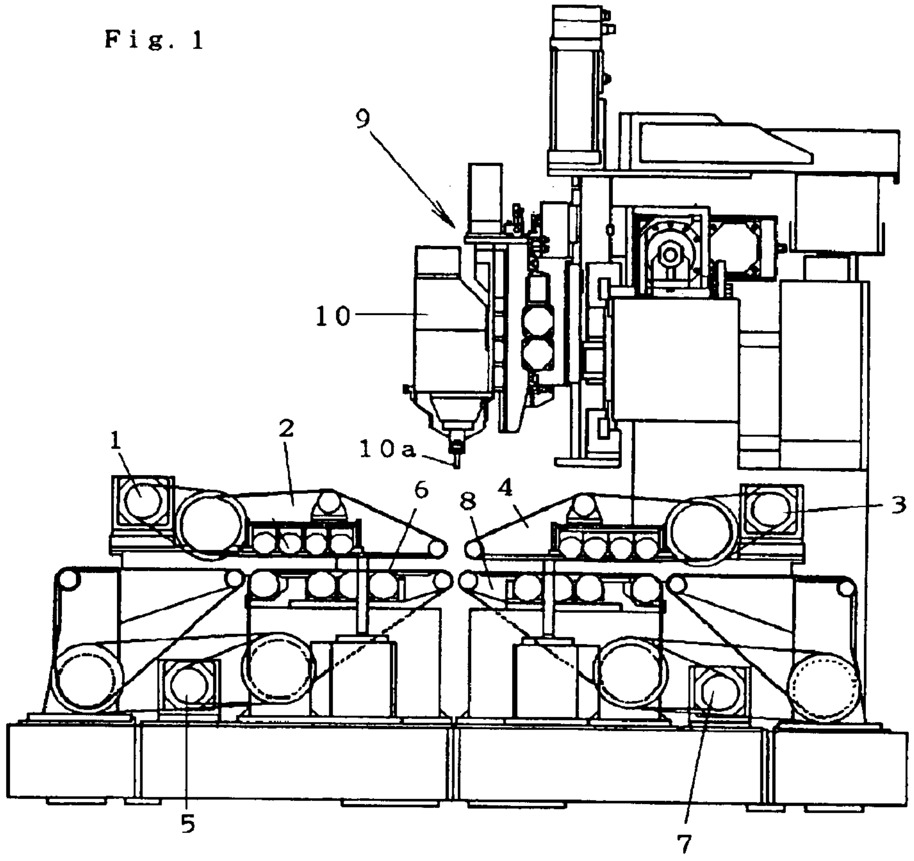
PRIOR ART Fig. 1
FIG. 1 shows a side view of a board processing unit according to the prior art.
Figure 2:
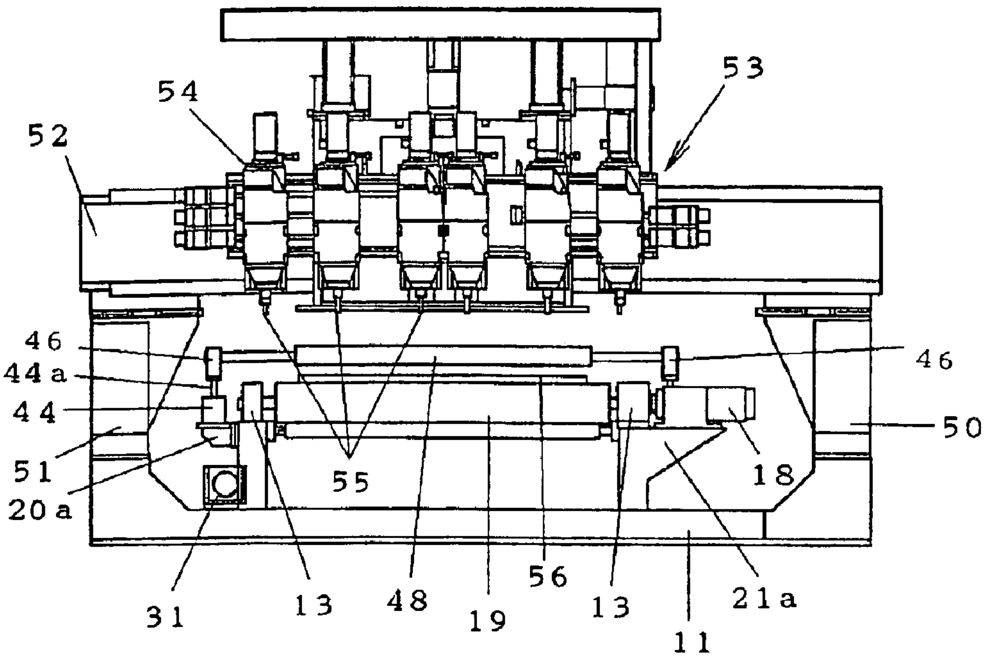
FIG. 2 shows a front elevational view of a board processing unit according to one embodiment of the present invention.
Figure 3:
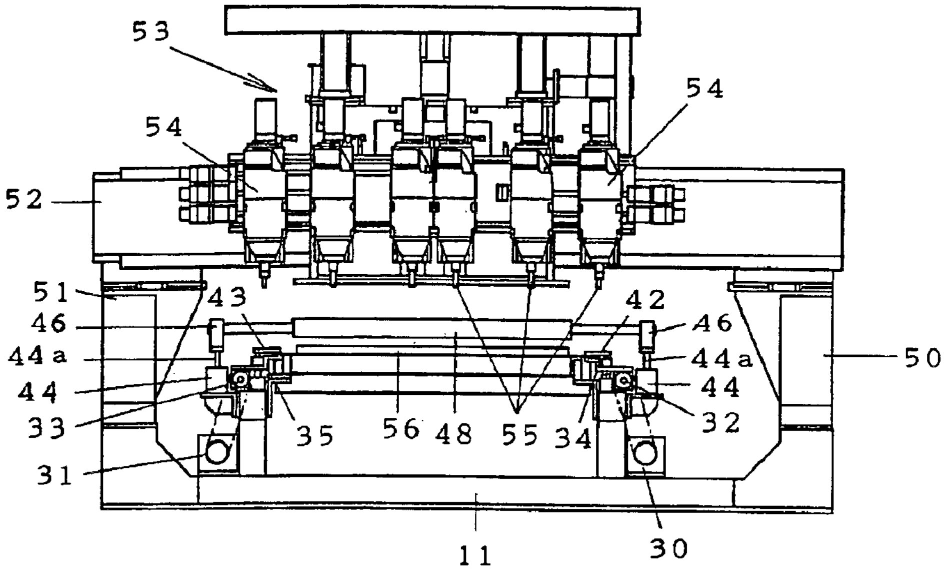
FIG. 3 shows a front elevational view of a part of the board processing unit of FIG. 2

Referring to FIG. 1, the prior board processing unit filed by the inventor comprises a first upper conveyer 2 driven by a first servomotor 1, a second upper conveyer 4 driven by a second servomotor 3, a first lower conveyer 6 positioned opposite to the first upper conveyer 2 and driven by a third servomotor 5, and a second lower conveyer 8 positioned opposite to the second upper conveyer 4 and driven by a fourth servomotor 7. The first, second, third and fourth servomotors are synchronously rotated with each other. A head 10 of a numerical control router 9 is mounted to an upper portion between the first and second upper conveyers 2 and 4, whereby a process board positioned between the first upper and lower conveyers 2 and 6 and the second upper and lower conveyers 4 and 8 is processed by a tool 10*a* of the head 10 which extends between the first and second upper conveyers 2 and 4.

However, in the prior board processing unit, though the first, second, third and fourth servomotors 1, 3, 5 and 7 are synchronously rotated with each other and the process board is held, positioned and processed between the first upper and lower conveyer 2 and 6 and between the second upper and lower conveyers 4 and 8, while the process board is moved by the first upper and lower conveyers 2 and 6 and the second upper and lower conveyers 4 and 8, the synchronization of the four conveyers 2, 4, 6 and 8 is shifted a little and the process precision of the process board is not entirely satisfactory.

Referring to FIGS. 2–6, an end support 12 is mounted on one end of a base 11, bearings 13 are mounted on the end support 12, a shaft of a large pulley 14 is rotatably supported by the bearings 13, an end support 15 is mounted on the other end of the base 11, bearings 16 are mounted on the end support 15, a shaft of a large pulley 17 is rotatably supported by the bearings 16, a motor 18 is connected to the shaft of the large pulley 14 and a carry belt 19 extends around the large pulleys 14 and 17.

Side supports 20 and 21 are attached to the outside of the carry belt 19, bearings 24 and 25 are severally mounted on the side supports 20 and 21, screw shafts 22 and 23 are rotatably supported by the bearings 24 and 25, pulleys 26 and 27 are fixed to the ends of the screw shafts 22 and 23, belts 28 and 29 extend around the pulleys 26 and 27 and respectively extend around pulleys of servomotors 30 and 31 supported on the base 11. Bosses 32 and 33 engage screw shafts 22 and 23 and are attached to the lower ends of moving members 34 and 35. Bearings 36 and 37 respectively attached to the lower ends of moving members 34 and 35 respectively engage rails 38 and 39. Plural cylinders 40 and 41 are severally mounted on the moving members 34 and 35, and grasping members 42 and 43 are fixed on the moving shafts 41*a* of the cylinders 40 and 41.

Plural up-down cylinders 44 and 45 are mounted on projecting portion 20*a* and 21*a* of the side supports 20 and 21. Bearings 46 and 47 are respectively attached to the driven shafts 44*a* and 45*a* of the up-down cylinders 44 and 45. Push rollers 48 and 49 are freely rotated and supported by the bearings 46 and 47 and are positioned above the upper surface of the carry belt 19. Props 50 and 51 are fixed on the base 11 on the side of the side supports 20 and 21, and both ends of a cross beam 52 are supported on props 50 and 51. A numerical control router 53 is movably mounted to the side of the cross beam 52, and a tool 55 attached to the head 54 of the numerical control router 53 can extend between the push rollers 48 and 49 so that the process board is processed by the tool 55.

Figure 4:
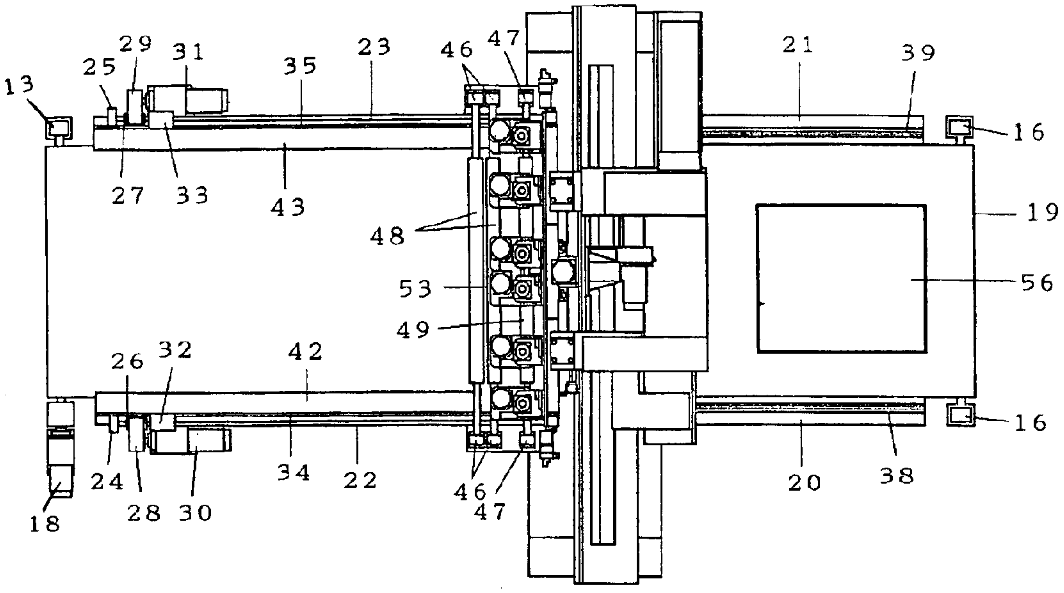
FIG. 4 shows a top plan view of the board processing unit of FIG. 2.
Figure 5:
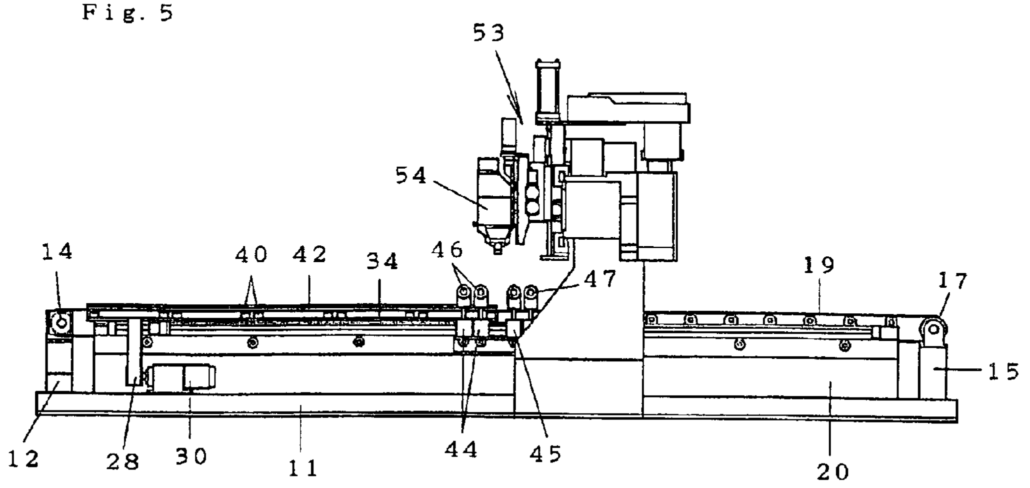
FIG. 5 shows a side elevational view of the board processing unit of FIG. 2.
Figure 6:
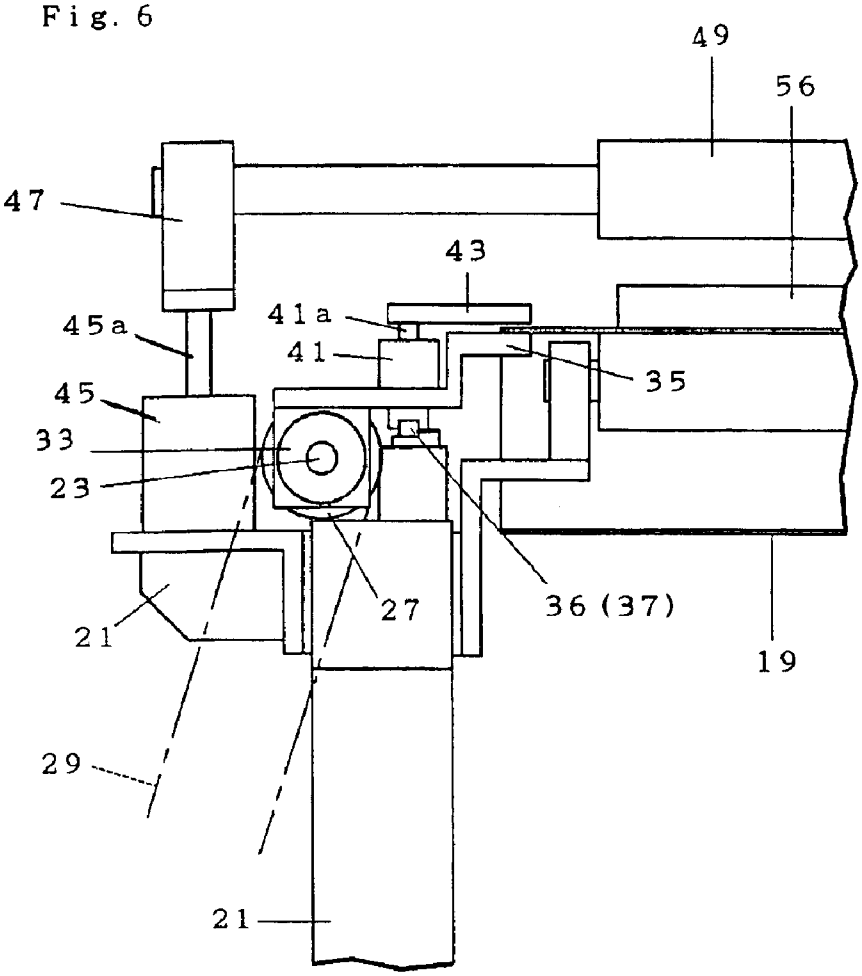
FIG. 6 shows an enlarged elevational view of a roller portion in the board processing unit of FIG. 2.

In the board processing unit in the present invention, when the process board is set on the carry belt 19, the moving members 34 and 35 waiting at the left side in FIG. 4 are synchronously moved by rotating the screw shafts 22 and 23 by the servomotors 30 and 31. When the moving members 34 and 35 are moved to the right side of FIG. 4, the servomotors 30 and 31 are stopped. Then, the cylinders 40 and 41 are driven, the grasping members 42 is and 43 attached to the driven shafts 40*a* and 41*a* are lowered, and both ends of the carry belt 19 are grasped by the grasping members 40 and 41. The servomotors 30 and 31 are conversely rotated, and the process board 56 set on the carry belt 19 is sent to a position below push rollers 48 and 49. Then, push rollers 48 and 49 are lowered onto process board 56 by driving the up-down cylinders 44 and 45, and the process board is held by push rollers 48 and 49. The head 54 is moved to the left and right of FIG. 1 and the moving members 34 and 35 are moved to the previous position of FIG. 1 by servomotors 32 and 33, whereby the predetermined processing is performed on the process board. After the processing of the process board is finished, the process board 56 is moved to the left side of FIG. 4 by moving the moving members 34 and 35 by the servomotors 30 and 31.

After the process board 56 is processed by the numerical control router 53, when the process board 56 is moved to the left side of FIG. 1 and the next process board is set on the carry belt 19, the process board 56 is carried to the outside by driving the motor 18 connected to the rotary shaft of the large pulley 17.

In this embodiment of the present invention, the carry belt 19 extends around the large pulleys 14 and 17, screw shafts 22 and 23 are synchronously rotated by servomotors 30 and 31, and moving members 34 and 35 are moved by moving bosses 32 and 33 along screw shafts 22 and 23. Both ends of the carry belt 19 are grasped by moving members 34 and 35 and grasping members 42 and 43 by moving cylinders 40 and 41 respectively mounted on the moving members 34 and 35, and carry belt 19 is moved by moving members 34 and 35.

Therefore, the moving of carry belt 19 does not lag the driving for positioning by servomotors 30 and 31, and the process board 56 set on the carry belt 19 and pushed by the pushing rollers is processed without lag of the position of the process board.

Figure 7:
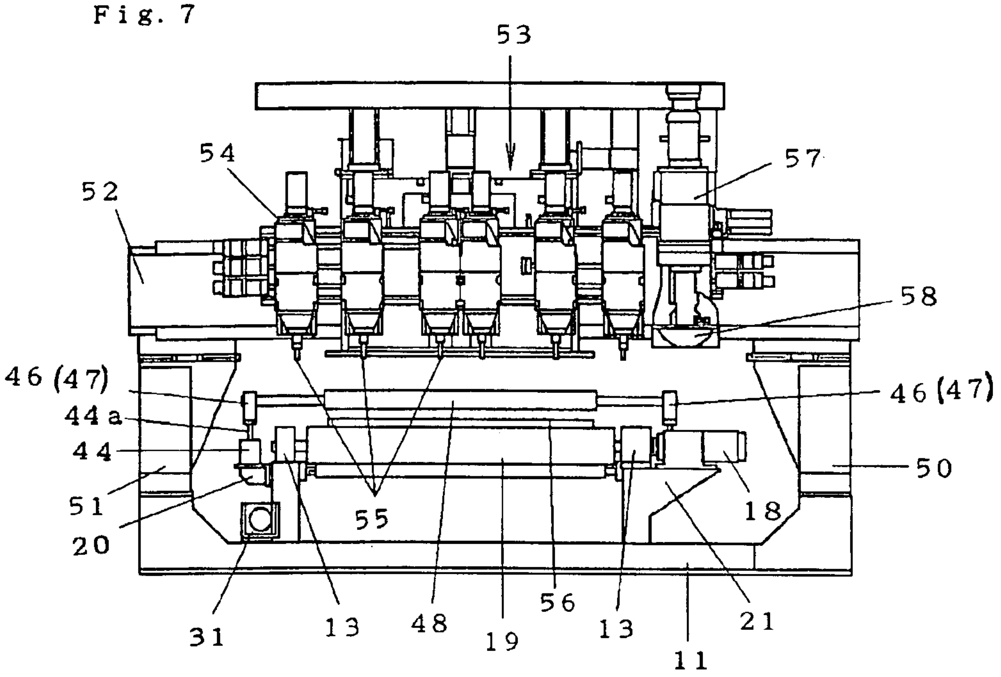
FIG. 7 shows a front elevational view of a board processing unit according to another embodiment of the present invention.

Referring to FIG. 7, 11 designates a base, 13, bearings; 19, a carry belt; 20 and 21, side supports; 31, a servomotor; 44, an up-down cylinder; 46 and 47, bearings; 48, a push roller; 50 and 51, props; 52, a cross beam; 53, a numerical control router; 54, heads; 55, a tool; and 56 designates a process board. These constitutions are the same as the first embodiment, and an explanation of these constitutions is omitted. In the present invention, a head 57 is added to the numerical control router 53, and a cut saw 58 is attached to the head 57.

In the present invention, the process of the control router 53 and the process of the cut saw 58 can be performed.

Though the above embodiment explains the process of the process board 56 due to the numerical control router 53 and the cut saw 58, the process board is processed by the other process equipment as boring equipment.

As stated above, in the board processing unit, both ends of the carry belt are grasped by the moving members and the grasping members, the moving members and the grasping members are synchronously moved by the servomotors, and the process board is carried by being held between the carry belt and the push rollers in the position of the processing of the process board.

Therefore, when the carry belt is carried by moving members, the carry belt does not lag in the process position, the process board is carried with the carry belt, and the processing of the process board is processed without lag.

What is claimed is:

1. A board process unit comprising:

opposite end supports, pulleys rotatably mounted, respectively, on the opposite end supports, a carrying belt extending around the pulleys for holding a process board to be processed, two parallel screw shafts mounted to an outside at opposite sides, respectively, of the carrying belt, at least one servomotor for rotating the two screw shafts, two moving members, each respectively having a boss engaging a respective screw shaft, first cylinders mounted on the two moving members, grasping members mounted respectively relative to the two moving members by the first cylinders for movement toward and away from the two moving members, such that both ends of the carrying belt are adapted to be grasped by the grasping members by moving the first cylinders respectively mounted on the two moving members, pushing rollers for pushing a process board positioned on the carrying belt, second cylinders for moving the pushing rollers into engagement with the process board for pushing the process board, and a processing unit for processing the process board.

2. A board process unit as set forth claim 1, wherein the processing unit includes a numerical control router.

3. A board process unit as set forth claim 1, wherein the processing unit includes a cut saw.

4. A board process unit as set forth claim 1, further comprising a motor for driving the carring belt, the motor being connected to one of the pulleys.

* * * * *